United States Patent
Hellmann et al.

(10) Patent No.: US 12,526,861 B2
(45) Date of Patent: Jan. 13, 2026

(54) SECURE CONNECTION FOR A PUBLIC WIRELESS COMMUNICATIONS DEVICE

(71) Applicant: HP (Chongqing) Co., Ltd, Chongqing (CN)

(72) Inventors: Ashley Hellmann, Novato, CA (US); Xiaohui Dang, Suzhou (CN); Robert Benjamin Foster, Eagle, ID (US); Nhu Quynh Pham Nguyen, Austin, TX (US); Titi Chen, Suzhou (CN)

(73) Assignee: HP (Chongqing) Co., Ltd, Chongqing (CN)

( * ) Notice: Subject to any disclaimer, the term of this patent is extended or adjusted under 35 U.S.C. 154(b) by 365 days.

(21) Appl. No.: 18/246,664

(22) PCT Filed: Oct. 2, 2020

(86) PCT No.: PCT/CN2020/119788
§ 371 (c)(1),
(2) Date: Mar. 24, 2023

(87) PCT Pub. No.: WO2022/067854
PCT Pub. Date: Apr. 7, 2022

(65) Prior Publication Data
US 2023/0371092 A1   Nov. 16, 2023

(51) Int. Cl.
*H04W 76/14* (2018.01)
*H04W 76/38* (2018.01)
(Continued)

(52) U.S. Cl.
CPC .......... *H04W 76/14* (2018.02); *H04W 76/38* (2018.02); *H04M 1/72412* (2021.01); *H04M 2250/02* (2013.01); *H04W 4/80* (2018.02)

(58) Field of Classification Search
None
See application file for complete search history.

(56) References Cited

U.S. PATENT DOCUMENTS

| | | | |
|---|---|---|---|
| 11,910,473 B2 * | 2/2024 | Nakahara | H04W 76/30 |
| 2010/0255782 A1 * | 10/2010 | Klemmensen | H04N 21/43637 |
| | | | 455/41.2 |

(Continued)

FOREIGN PATENT DOCUMENTS

| | | |
|---|---|---|
| CN | 106603830 A | 4/2017 |
| CN | 107820232 A | 3/2018 |
| CN | 109660973 A | 4/2019 |

*Primary Examiner* — Rafael Pérez-Gutiérrez
(74) *Attorney, Agent, or Firm* — Quarles & Brady LLP

(57) ABSTRACT

A public telecommunications device (100, 201, 301, 401, 501, 901) configured to detect a channel connection-initiation signal (403, 503) from a wireless communications device (100, 202, 302, 402, 502, 902) which is paired with the public telecommunications device and render a prompt (408, 410) in response. The public telecommunications device will fully establish a wireless channel connection (306) with the wireless communications device only if the public telecommunications device detects a designated user input in response to the prompt (408, 410). If the public telecommunications device detects that a call (905) of the wireless communications device has ended, the wireless channel connection will be promptly terminated, unless a second designated user input is detected at the public telecommunications device. The risk of accidental or unintended connectivity to the public telecommunications device is thus minimized.

16 Claims, 12 Drawing Sheets

(51) Int. Cl.
*H04M 1/72412* (2021.01)
*H04W 4/80* (2018.01)

(56) References Cited

U.S. PATENT DOCUMENTS

| | | |
|---|---|---|
| 2014/0342670 A1 | 11/2014 | Kang et al. |
| 2015/0341973 A1* | 11/2015 | El-Hoiydi ........... H04W 68/005 |
| | | 455/3.06 |
| 2019/0320054 A1 | 10/2019 | Thorington |
| 2020/0359186 A1* | 11/2020 | Goel ................... G06Q 20/3278 |
| 2022/0141912 A1* | 5/2022 | Grover ................. H04W 76/23 |
| | | 455/39 |

* cited by examiner

SECURE CONNECTION FOR A PUBLIC WIRELESS COMMUNICATIONS DEVICE

TECHNICAL FIELD

This disclosure relates generally to electronic communications devices and relates particularly to preventing an electronic communications device from unintentionally or inadvertently establishing or cancelling a wireless communication channel with another electronic communications device.

BACKGROUND

Many electronic communications devices can be linked with one or more other electronic communications devices over one or more channel connections. For public electronic communications devices—such as a speaker phone in an office meeting room—the ability to link with one or more electronic communications devices can sometimes mean that the public communications device can become linked to an electronic communications device (e.g., a mobile phone) even when a user of the public communications device or a user of the other electronic communications device did not intend for a link to be established. Similarly, there can be times when a user of an electronic communications device (e.g., mobile phone) inadvertently remains connected to the public electronic communications (e.g., speaker phone) device longer than intended. Thus, there is room for improvement in the art.

SUMMARY

A first example of this disclosure is a method of managing channel connectivity of an electronic communications device (ECD). The method includes: receiving, at a first electronic communications device, a channel connection-initiation signal from a second electronic communications device; rendering a prompt at the first electronic communications device, responsive to receiving the channel connection-initiation signal; detecting, at the first electronic communications device, a first user input corresponding to the prompt; establishing, at the first electronic communications device, a base channel with the second electronic communications device, responsive to detecting the first user input corresponding to the prompt; and connecting, by the first electronic communications device, with the second electronic communications device over a channel connection, responsive to establishing the base channel.

A second example of this disclosure is a telecommunications device comprising a processor coupled to a memory. The memory stores instructions which are executable by the processor. The instructions comprise instructions to: detect, at the telecommunications device, a channel connection-initiation signal from a wireless communications device; render a prompt at the telecommunications device, responsive to detecting the channel connection-initiation signal; detect, at the telecommunications device, a first user input corresponding to the prompt; establish a base channel between the telecommunications device and the wireless communications device, responsive to (and contingent upon) detecting the first user input corresponding to the prompt; and connect the telecommunications device to the wireless communications device over a channel connection, responsive to establishing the base channel.

A third example of this disclosure is a method of managing a channel connection of an ECD. The method comprises: establishing, at a first ECD, a channel connection with a second ECD to which the first ECD was previously paired/bonded; rendering, responsive to establishing the channel connection with the second ECD, a prompt at the first ECD; detecting, at the first ECD, a user input corresponding to the prompt; receiving, at the first ECD, one or more data packets from the second ECD over one or more channels of the channel connection; and decoding, using a decoder of the first ECD, the one or more data packets from the second ECD, responsive to detecting, at the first ECD, the user input corresponding to the prompt.

A fourth example of this disclosure is a method of managing a channel connection of an ECD. The method includes: establishing, at a first ECD, a channel connection with a second ECD; receiving, at the first ECD, one or more data packets from the second ECD over one or more channels of the channel connection, the one or more data packets corresponding to a telephonic call of the second ECD; determining, at the first ECD, that the telephonic call of the second ECD has ended; rendering, responsive to determining that the telephonic call of the second ECD has ended, a prompt at the first ECD; determining, at the first ECD, that a user input corresponding to the prompt has not been detected within a predetermined length of time since rendering the prompt; and terminating, by the first ECD, the channel connection with the second ECD, responsive to determining that the user input corresponding to the prompt has not been detected within the predetermined length of time since rendering the prompt.

BRIEF DESCRIPTION OF THE DRAWINGS

For illustration, there are shown in the drawings certain examples described in the present disclosure. The full scope of the inventions disclosed herein are not limited to the precise arrangements, dimensions, and instruments shown.

DETAILED DESCRIPTION

Figure 1:
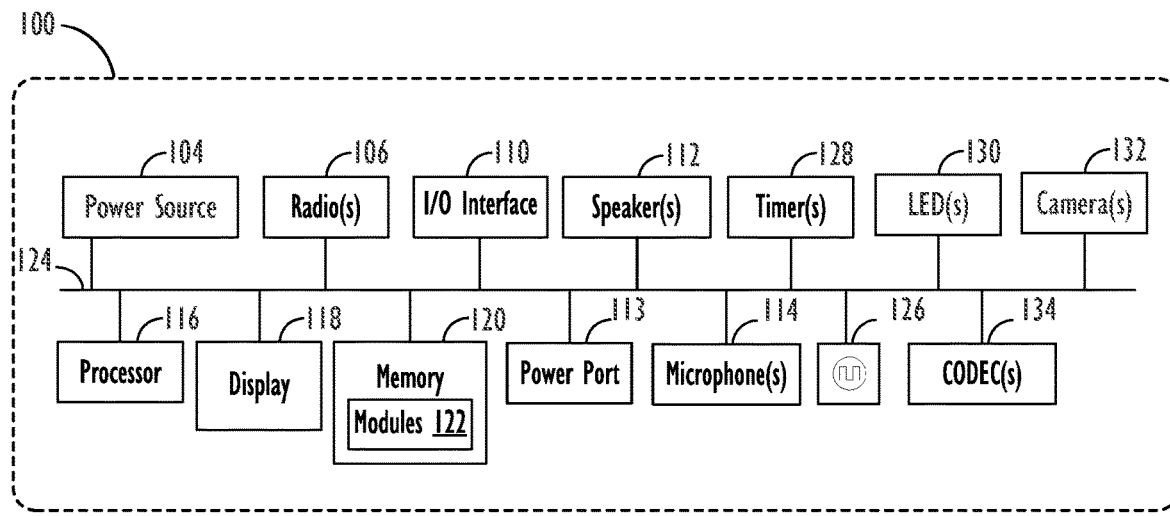
FIG. 1 is a block diagram of an electronic communications device, in accordance with an example of this disclosure.

In the drawings and the description of the drawings herein, certain terminology is used for convenience only and is not to be taken as limiting the examples of the present disclosure. In the drawings and the description below, like numerals indicate like elements.

FIG. 1 is a block diagram of an electronic communications device (ECD) 100, in accordance with an example of this disclosure. The ECD 100 can include a power source 104 (e.g., a battery of rechargeable cells) and a radio 106 which can be used to communicate wirelessly with one or more other ECDs (e.g., headset, smart phone, computer, etc.). The ECD 100 includes a user interface 110 (e.g., actuable buttons, touchscreen, keyboard, mouse, etc.). The ECD 100 can include one or more speakers 112 and one or more microphones 114. The ECD 100 can include a power port 113 which can be used to couple the internal power source 104 to an external power source (e.g., mains power) to recharge the internal power source 104. The ECD 100 also includes a processor 116 which is coupled to the power source 104, the radio(s) 106, the speaker(s) 112, the microphone(s) 114, and the other components (e.g., 118-134) through a bus 124. The ECD 100 also includes a memory 120 which can store various modules 122 (of computer readable instructions) which are executable by the processor 116 to control the functions of the remaining components and their interactions with each other, as would be understood by a person of skill. In some examples, the modules (instructions) 122 comprise firmware executable by the processor 116. The ECD 100 also includes one or more clock signal generators 126 which can be used to control the timing and synchronization of ECD 100 operations. The ECD 100 also includes one or more timers 128 which can be used to track the amount of time between events and can be used in determining whether a period of time has expired, (e.g., that the ECD 100 has not received a data transmission from another device within the last five minutes and so ends a data connection with the other device). It should be recognized by those of skill in the art that the components of the ECD 100 described are illustrative, not limiting. The ECD 100 can also include one or more light emitting diodes (LEDs) 130. The ECD 100 can also include a camera 132 for capturing video. The ECD 100 also includes one or more encoder-decoders 134 (CODECS) which the ECD 100 uses to encode messages for transmission to other devices and to decode messages received from other devices. In some examples of this disclosure, an ECD 100 will not comprise all such components. Likewise, an ECD 100 of this disclosure may include additional components, as would be understood by those of skill. Examples of ECDs 100 within this disclosure include, but are not limited to, mobile phones, headsets, automotive transceivers, personal computers, desktop phones, laptop computers, and tablet computers, each of which can operate in accordance with one or more communications protocols (e.g., Bluetooth®, DECT, Wi-Fi®).

Figure 2A:
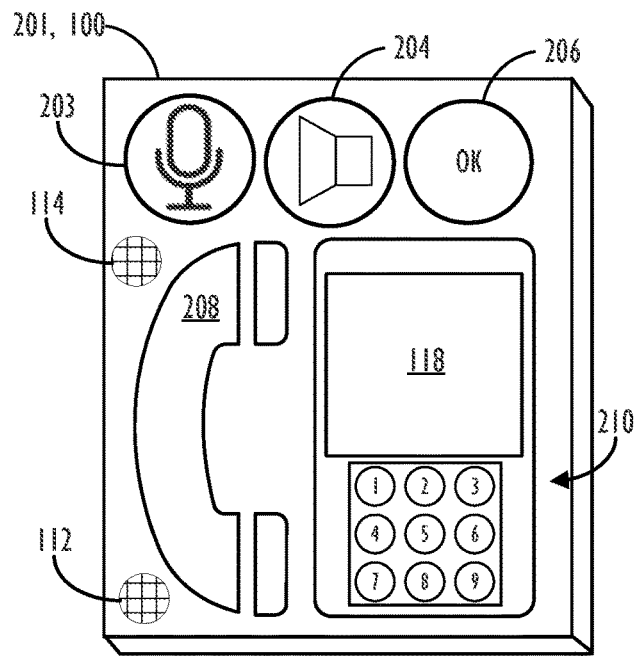
FIG. 2A illustrates a speakerphone, in accordance with an example of this disclosure.

FIG. 2A illustrates an ECD 100 which is a speakerphone 201, in accordance with an example of this disclosure. The speakerphone 201 includes a mute button 203, a speaker actuation button 204, and a connection acceptance (e.g., OK) button 206. The speakerphone 201 also includes a microphone 114, a removable handset 208, a speaker 112, a display 118, and a user interface 210 comprising a plurality of actable keys (buttons).

Figure 2B:
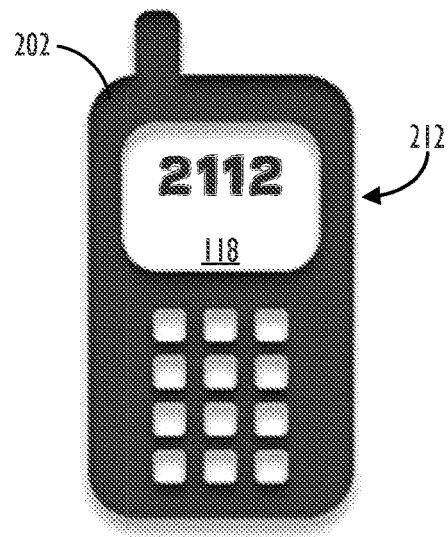
FIG. 2B illustrates a mobile phone, in accordance with an example of this disclosure.

FIG. 2B illustrates an ECD 202 (e.g., 100) which is a mobile phone displaying an alphanumeric code 212 on a display 118. In at least one example of this disclosure, a person will need to enter the displayed code 212 at a user interface 210 of an ECD (e.g., 201) before the ECD 201 will render audio and/or video transmitted by ECD 202.

Figure 3:
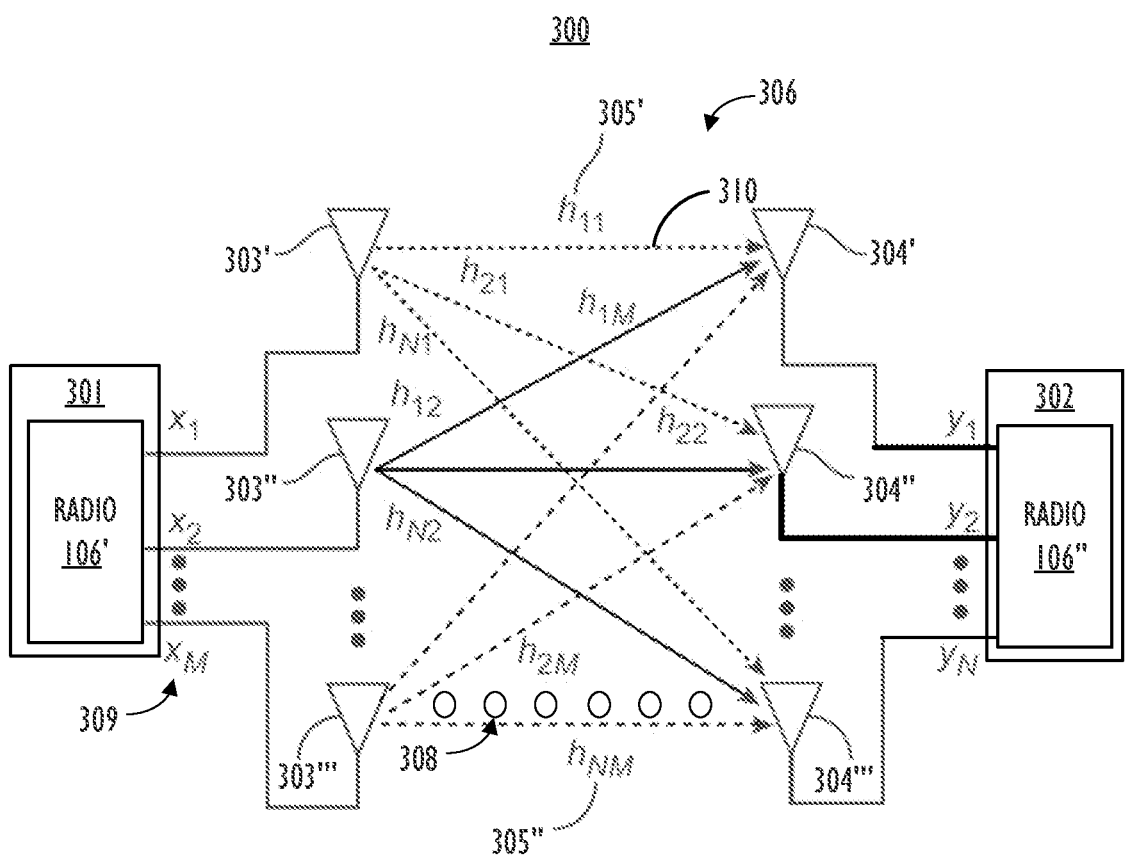
FIG. 3 illustrates two electronic communications devices communicating over a channel connection, in accordance with an example of this disclosure.

FIG. 3 illustrates an operational environment 300 of a first ECD 301 (e.g., 201) and a second ECD 302 (e.g., 202), in accordance with an example of this disclosure. Both the first ECD 301 and the second ECD 302 include one or more radios 106. The radio 106 of the first ECD 301 includes one or more transmit antennas 303, and the radio 106 of the second ECD 302 includes one or more receive antennas 304. In FIG. 3, one or more data streams 305 are transmitted using M transmit antennas 303 of the first ECD 301 and received by N receive antennas of the second ECD 302. The one or more data streams 305 are based on one or more M transmit signals 309. Each of the data streams 305 can comprise one or more data packets 308. One or more data streams 305 transmitted at a given frequency can constitute a channel 310 in one or more examples of this disclosure. Thus, a channel connection 306 can be comprised of multiple channels 310, with each channel 310 having a bandwidth. For example, when the first ECD 301 and the second ECD 302 are communicating in accordance with a protocol such as Bluetooth, a channel connection can contain 79 channels 310, each having a bandwidth of 1 Megahertz. In some examples, before a channel connection 306 can be established between two devices, an initial control channel (e.g., 310) must be established. The ability of the first ECD 301 and the second ECD 302 to communicate the one or more data streams 305 forms the channel connection 306 between them. In accordance with one or more examples of this disclosure, when ECDs (e.g., 201, 202) are in signal communication over a channel connection 306, each ECD can be said to be in a state of 'channel connectivity.' Such factors as the positions of individual transmit antennas 303 and individual receive antennas 304, signal strength, and unintended coupling of individual transmit antennas 303 and individual receive antennas 304 can affect the state of the channel connection 306. It will be understood by those of skill that the one or more transmit antennas 303 of the first ECD 301 can also serve as receive antennas to receive one or more data streams 305 emitted by the antennas 304 of the second ECD 302 (through appropriate signal-multiplexing). In at least some examples of this disclosure, an ECD (e.g., 301) can form a channel connection 306 with a second ECD (e.g., 302) only if the ECDs (e.g., 201, 202) are paired (bonded). That is, the two devices must have shared enough information such that they will acknowledge data streams (e.g., 305) from one another and that the data streams (e.g., 305) will be transmitted in accordance with a given protocol.

In at least one example of this disclosure, two ECDs (e.g., 301, 302) establish a link key as part of the pairing process, which enables the ECDs (e.g., 301, 302) to encrypt and decrypt data sent between them. It will be understood then that a given ECD (e.g., 201) can be paired with multiple other ECDs (e.g., 202). It will be understood further that as a consequence of being paired with multiple other ECDs (e.g., 202), an ECD (e.g., 201) can form channel connections 306 with multiple other ECDs (e.g., 202) simultaneously. Each channel connection 306 constitutes a data path through which multiple bits of data can be continuously transmitted and received. In various examples of this disclosure, data packets 308 can include groupings of such bits of data. As will be understood by those familiar with the Bluetooth standard and other protocols, although an ECD 100 may be receiving data streams (e.g., 305) from a first ECD (e.g., 301) over a first channel connection 306, the ECD 100 can still detect signals from another device (e.g. 302) to which it is paired.

Figure 4A:
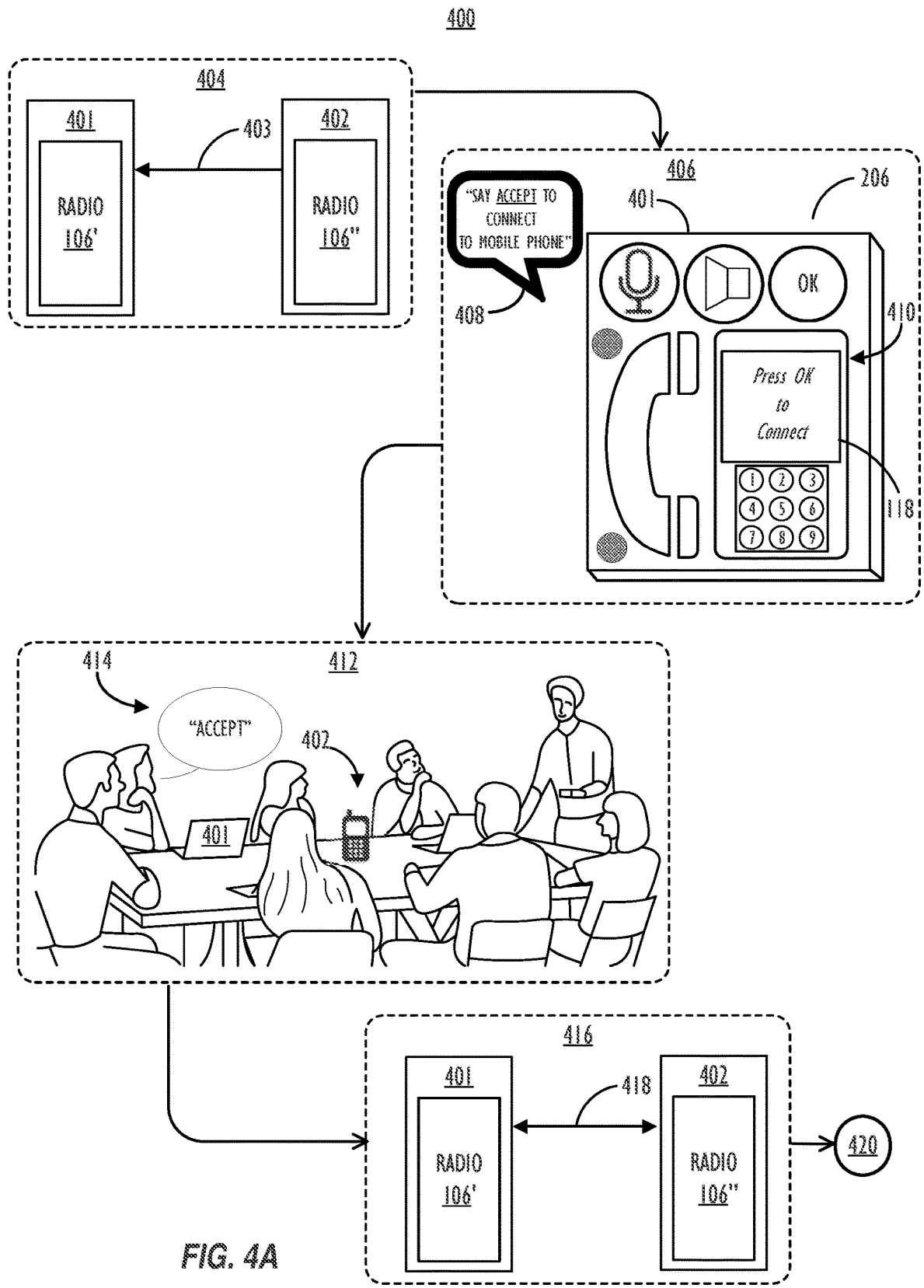
FIGS. 4A-4B illustrate a process of managing channel connectivity of an electronic communications device, in accordance with an example of this disclosure.
Figure 4B:
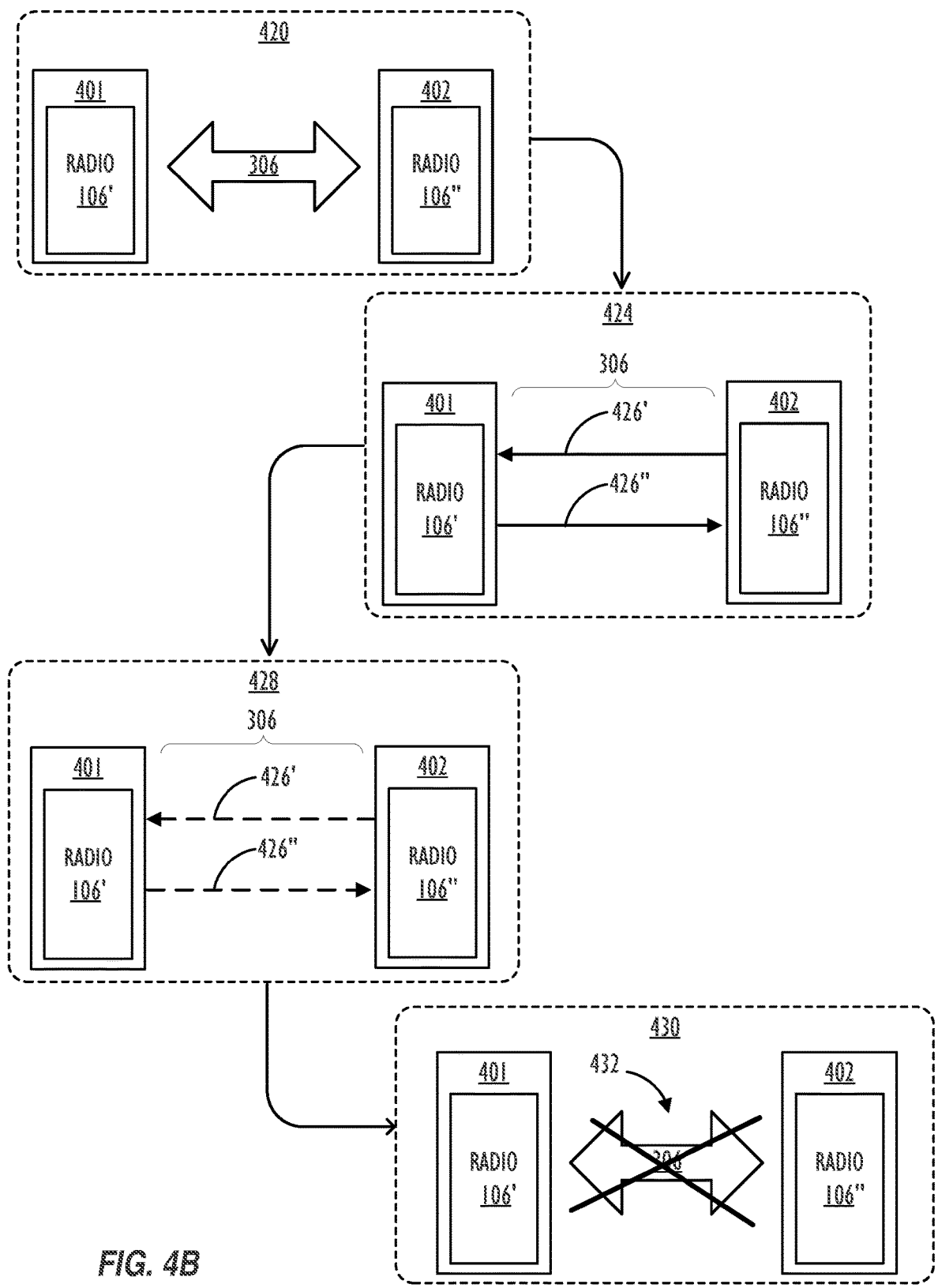

FIGS. 4A-4B illustrate a process 400 of managing channel connectivity of an ECD 100, in accordance with an example of this disclosure. In the first step 404, a first ECD 401 (e.g., 201, 301) receives (detects) a channel connection-initiation signal 403 from a second ECD 402 (e.g., 202). In accordance with one or more examples, first ECD 401 and second ECD 402 are paired. That is, before process 400 commences, the first ECD 401 and second ECD 402 previously shared enough information such that they are able to acknowledge data streams (e.g., 305) from one another over a channel connection 306 in accordance with an agreed protocol. (In at least one example, detecting channel connection-initiation signal 403 by the first ECD 401 includes establishing a logical link between the first ECD 401 and the second ECD 402.) At step 406, in response to detecting the channel connection-initiation signal 403, the first ECD 401 renders a prompt for a user to take some action. Rendering a user prompt can include issuing an auditory instruction 408 or displaying a message 410 on a display 118. In some examples, rendering a prompt can comprise activating one or more LEDs (e.g., 130) visible through a translucent portion of the OK button 206. In some examples, rendering a prompt can comprise displaying a message 410 for a user to input a code 212 displayed by a display 118 of the second ECD 402 (e.g., 202).

In the next step 412, the first ECD 401 detects a user input 414 corresponding to the prompt 408. By saying "accept" in response to the prompt 408, the user has indicated their desire to connect the first ECD 401 to the second ECD 402. Therefore, in step 416, the first ECD 401 establishes a base channel 418 (e.g., 310) with the second ECD 402; unless the user input (e.g., 414) is detected, no base channel 418 will be established between the paired devices (401, 402). In some examples, the base channel 418 can carry command or control instructions from one device to the other device to coordinate/govern how data will be streamed between the first ECD 401 and the second ECD 402. The process 400 then proceeds to step 420 in FIG. 4B.

At step 420, the first ECD 401 connects to the second ECD 402 over a channel connection 306. At step 424, the first ECD 401 receives streams 426 of data packets (e.g., 308) from the second ECD 402 over one or more channels (e.g., 310) of the channel connection 306, and sends streams 426 of data packets to the second ECD 402 over one or more channels of the channel connection 306. At step 428, the first ECD 401 (using e.g., a processor 116 and a timer 128) may determine that the time since the last packet was received by the first ECD 401 has exceeded a limit which is consistent with a user of the second ECD 402 having ended a call or having forgotten to affirmatively end their call or having neglected to terminate the wireless link (e.g., channel connection 306) between first ECD 401 and second ECD 402. Alternately or additionally, at step 428 the first ECD 401 may determine that it has been too long since the first ECD 401 has captured audio and/or video (using one or more microphones 114 and/or one or more cameras 132) and transmitted data streams 426 corresponding to the captured audio and/or video to the second ECD. Due to such a 'timeout,' the process 400 will proceed to step 430, in which the first ECD 401 terminates 432 the channel connection 306. Unless additional steps are taken, the first ECD 401 and the second ECD 402 remain paired, as they were prior to implementation of process 400.

Figure 5A:
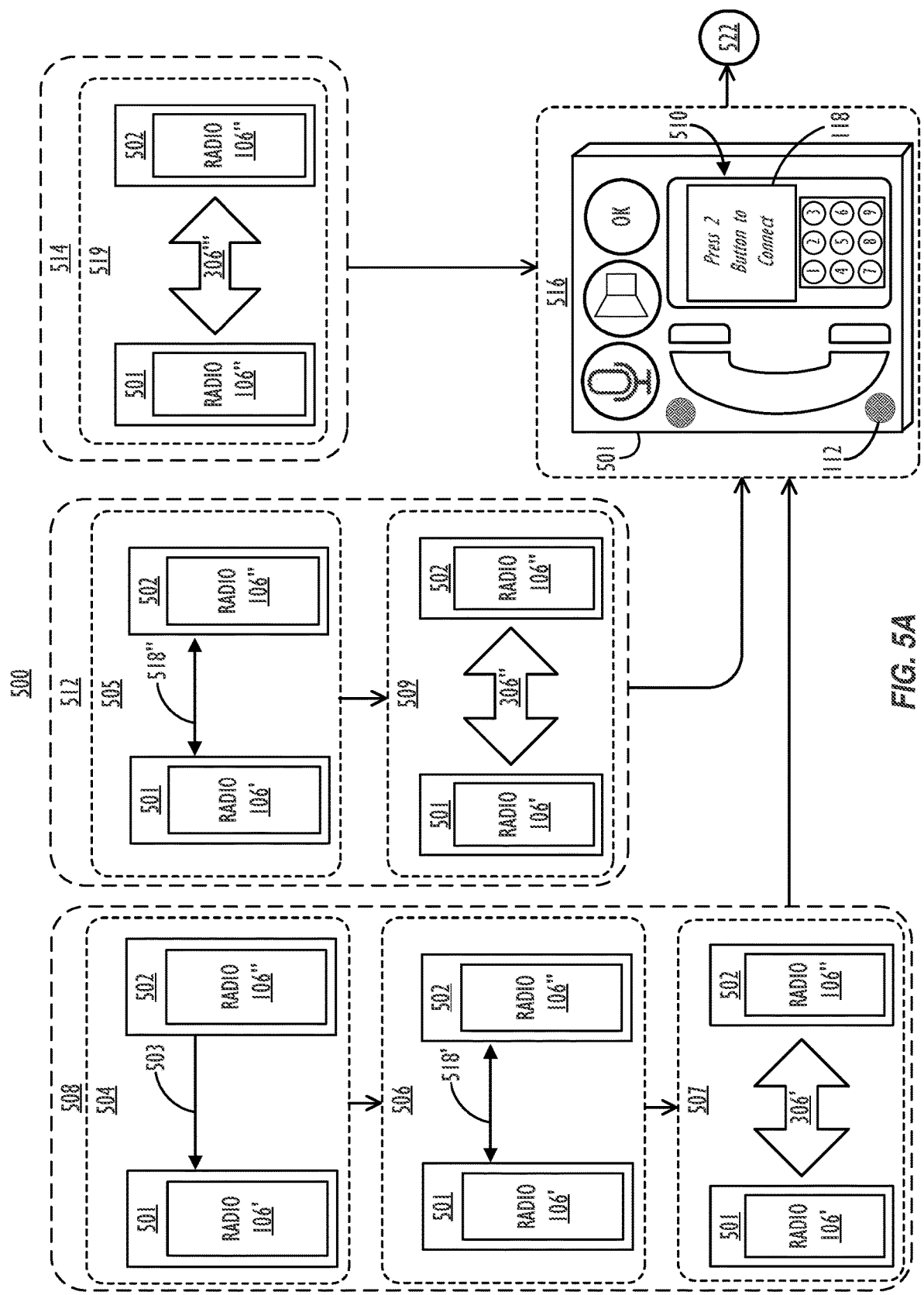
FIGS. 5A-5B illustrate another process of managing channel connectivity of an electronic communications device, in accordance with an example of this disclosure.
Figure 5B:
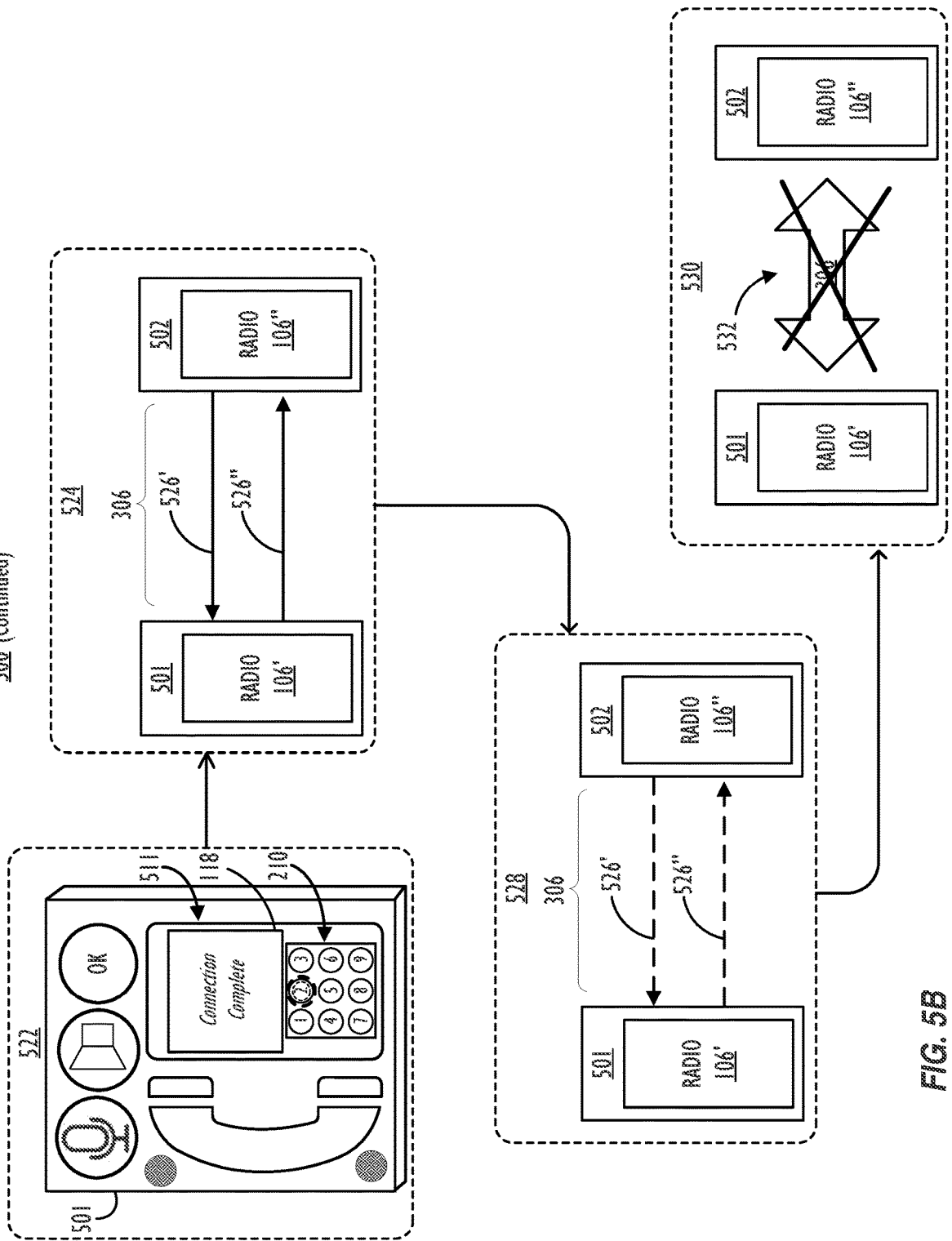

FIGS. 5A-5B illustrate another process 500 of managing channel connectivity of an ECD 100, in accordance with an example of this disclosure. In process 500 there are three alternate paths—path 508, path 512 and path 514—which lead to step 516, in which a user is prompted to take some action to confirm their desire to wirelessly connect two paired ECDs (e.g., 201, 202) in signal communication.

The first step of path 508 is step 504, the first step of path 512 is step 505, and the first step of path 514 is step 519. Thus, process 500 can begin at step 504 of path 508, at step 505 of path 512, or step 519 of path 514. In the first step 504 of path 508, a first ECD 501 (e.g., 201) receives a channel connection-initiation signal 503 from a second ECD 502 (e.g., 202). In accordance with one or more examples, first ECD 501 and second ECD 502 are paired (with one another). E.g., at some time before step 504 of path 508 began, the first ECD 501 and the second ECD 502 shared enough information such that they could acknowledge data streams (e.g., 305) from one another according to agreed protocols.

At step 506 of path 508, in response to detecting the channel connection-initiation signal 503, the first ECD 501 establishes a base channel 518 (e.g., 310) with the second ECD 502. In some examples, the base channel 518 will carry command or control instructions from one device (e.g., 502) to the other device (e.g., 501) to coordinate/govern how data will be streamed between the two devices (e.g., 301, 302). The process 500 then proceeds to step 507 of path 508. At step 507, the first ECD 501 connects to the second ECD 502 over a channel connection 306. After step 507 of path 508 is completed, the process 500 proceeds to step 516, in which the first ECD 501 renders a prompt (e.g., 510) for a user to take some action.

As noted, in accordance with process 500, step 516 can alternately be reached through path 512. At the first step 505 of path 512, a base channel 518 (e.g., 310) is established between the paired/bonded first ECD 501 and second ECD 502 in the absence of a channel connection-initiation signal 503. As in path 508, the base channel 518 may carry command or control instructions from one device (e.g., 501) to the other device (e.g., 502) to coordinate/govern how data will be streamed between the two devices (e.g., 201, 202). In path 512, the process 500 then proceeds to step 509. At step 509, a channel connection 306 is established between the first ECD 501 and the second ECD 502. After step 509 of path 512, the process 500 proceeds to step 516, in which the first ECD 501 renders one or more user prompt(s) (e.g., 510) for a user to perform one or more actions; in this case, the first ECD 501 prompts the user to press the "2" button of the first ECD 501.

As noted, in accordance with process 500, step 516 can alternately be reached through path 514. Path 514 includes a single step—step 519. At step 519, the second ECD 502 establishes a channel connection 306 with the first ECD 501 to which it is paired, without transmitting a channel connection initiation-signal 503 and without establishing a base channel 518. After step 519 of path 514, the process 500 proceeds to step 516, in which the first ECD 501 renders one or more user prompt(s) (e.g., 510) as already explained. In one or more examples of this disclosure, detecting channel connection-initiation signal 503 (e.g., 403) and/or establishing a base channel 518 (e.g., 310) and/or establishing a channel connection 306 includes establishing a logical link between the first ECD 501 and the second ECD 502.

At step 516, rendering a user prompt can include such operations as issuing an auditory instruction (e.g., 408) or displaying a message 510. In the example of FIG. 5A, rendering a user prompt comprises displaying a message 510 on a display 118. As noted in the discussion of FIGS. 4A-4B, in some examples, rendering a prompt can also include activating one or more LEDs (e.g., 130). Activating one or more LEDs can be accompanied by rendering a sound through a speaker (e.g., 112). Once the user prompt has been rendered, the process 500 then proceeds to step 522 of FIG. 5B.

In step 522 the first ECD 501 detects a user input corresponding to the prompt 510, (see FIG. 5A). In step 522 a user presses the "2" button of interface (keypad) 210. The user has thus indicated they wish to connect the first ECD 501 to the second ECD 502 and/or maintain the established channel connection 306. In some examples, the first ECD 501 can display a message (e.g., 511) or render some other indication that the designated user input has been detected. Because the first ECD 501 detected the user input corresponding to the prompt (510), the process 500 can proceed to step 524, in which the first ECD 501 receives streams 526 of data packets (e.g., 308) from the second ECD 502 over one or more channels (e.g., 310) of the channel connection 306, decodes the received streams 526, and renders audio and/or video corresponding to the received streams 526. Also, at step 524, first ECD 501 can send streams 526 of data packets (e.g., 308) to the second ECD 502 which correspond to audio and/or visual captured (and encoded) at the first ECD 501. Put another way, because the user indicated their desire to connect the paired/bonded first ECD 501 and second ECD 502, the second ECD 502 'gains access' to one or more speakers (e.g., 112) and one or more microphones (e.g., 114) of first ECD 501. In some examples, if the first ECD 501 is configured to capture video using a camera device (e.g., 132), the second ECD 502 may also gain access to the camera device at step 524.

Later, the first ECD 501 (e.g., using a processor 116 and one or more timers 128) may determine that the length of time since the last packet (e.g., 308) was received by the first ECD 501 from the second ECD 502 has exceeded a limit indicative of a user of the second ECD 502 having ended a call and/or having left the room where the first ECD 501 was located while having forgotten to end their call or forgotten to cancel the link (e.g., channel connection 306) between first ECD 501 and second ECD 502. Alternately or additionally, at step 528 the first ECD 501 may determine that it has been too long since the first ECD 501 has captured audio and/or video (using one or more microphones 114 and or camera(s) 132) and transmitted data packets (e.g., 308) corresponding to the captured audio and/or video. Due to such a 'timeout,' the process 500 will proceed to step 530 in which the first ECD 501 terminates 532 the channel connection 306.

Figure 6:
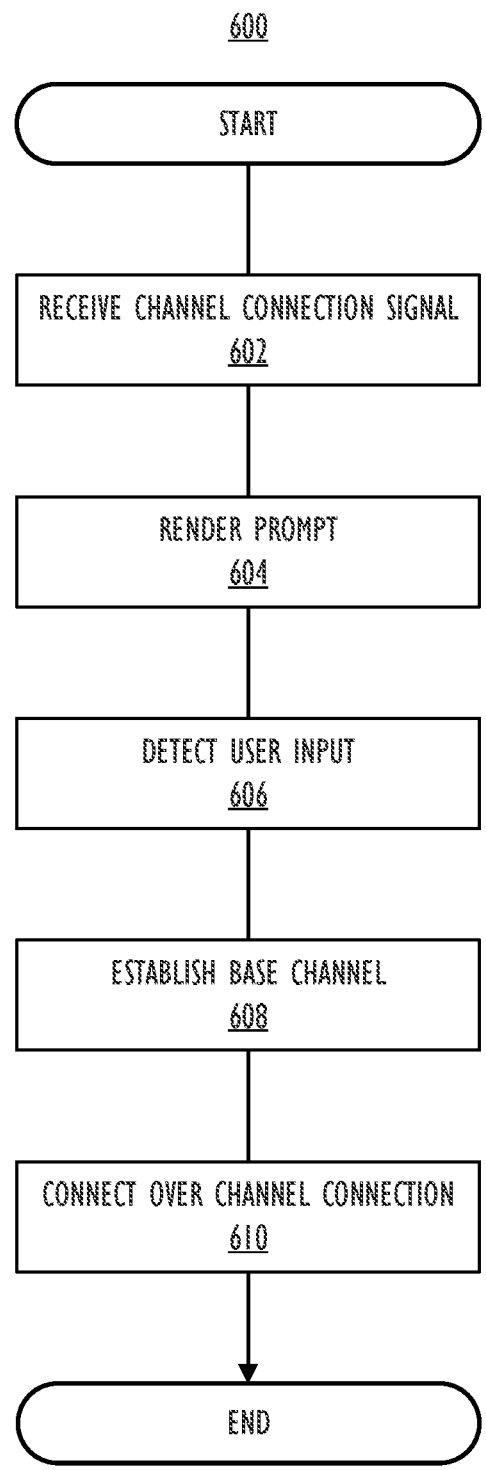
FIG. 6 illustrates a method of managing channel connectivity of an electronic communications device, in accordance with an example of this disclosure.

FIG. 6 illustrates a method 600 of managing channel connectivity of an ECD 100. The method 600 includes receiving 602, at a first ECD (e.g., 201, 301, 401, 501), a channel connection-initiation signal (e.g., 403, 503) from a second ECD (100, 502) to which the first ECD is paired and rendering 604 a prompt (see e.g., 406, 516) at the first ECD, responsive to receiving the channel connection-initiation signal (e.g., 403, 503). Thereafter, the method 600 includes detecting 606, at the first ECD, a first user input corresponding to the prompt and thereafter establishing 608 (contingent upon the detecting 606), at the first ECD, a base channel (e.g., 310, 418, 518) with the second ECD (e.g., 202, 302, 402, 502). The last step of method 600 includes connecting 610, by the first ECD, with the second ECD over a channel connection (e.g., 306), responsive to establishing the base channel.

Figure 7:
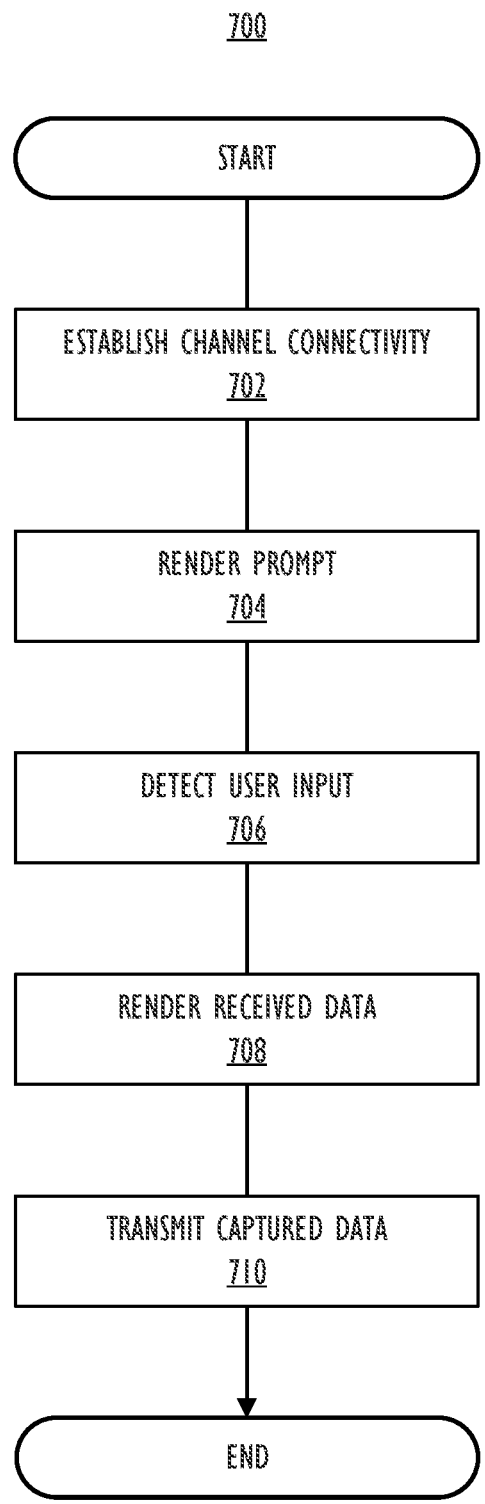
FIG. 7 illustrates another method of managing channel connectivity of an electronic communications device, in accordance with an example of this disclosure.

FIG. 7 illustrates another method 700 of managing channel connectivity of an ECD 100, in accordance with an example of this disclosure. The method 700 includes establishing 702 a channel connection between a first ECD (e.g., 201, 301, 401, 501) and a second ECD (e.g., 202, 302, 402, 502) to which the first ECD is paired and rendering 704 a prompt (e.g., 408, 410, 510) at the first ECD, responsive to establishment of the channel connection (e.g., 306). Thereafter, the method 700 includes detecting 706, at the first ECD, a first user input corresponding to the prompt. Responsive to detecting 706 the indicated user input, the first ECD will render 708 data received from the second ECD over the channel connection and transmit data captured at the first ECD over the channel connection to the second ECD.

In at least one example of this disclosure, method 600 and/or method 700 also include: receiving, at the first ECD (e.g., 201, 301, 401, 501), one or more data packets (e.g., 308) from the second ECD (e.g., 202, 302, 402, 502) over one or more channels (e.g., 310) of the channel connection (e.g., 306); determining that a length of time since a reception of a most recently received data packet exceeds a predetermined threshold; and terminating (e.g., 432, 532), by the first ECD, the channel connection (e.g., 306) with the second ECD, responsive to determining that the length of time since the reception of the most recently received data packet exceeds a predetermined threshold.

In some examples, method 600 and/or method 700 also include: receiving, at the first ECD (e.g., 201, 301, 401, 501), one or more data packets (e.g., 308) from the second ECD (e.g., 202, 302, 402, 502) over one or more channels (e.g., 310) of the channel connection (e.g., 306); determining that a length of time since a reception of a most recently received data packet exceeds a predetermined threshold; rendering a second prompt (see e.g., 406, 516) at the first ECD, responsive to determining that the length of time since the reception of the most recently received data packet exceeds a predetermined threshold; determining, at the first ECD, that a second user input corresponding to the second prompt has not been detected within a predetermined length of time since rendering the second prompt; terminating (e.g., 432, 532), by the first ECD, the channel connection with the second ECD, responsive to determining that the second user input corresponding to the second prompt has not been detected within the predetermined length of time since rendering the second prompt.

In accordance with some examples of method 600 and method 700, terminating (e.g., 432, 532), by the first ECD (e.g., 201, 301, 401, 501), the channel connection (e.g., 306) with the second ECD (e.g., 202, 302, 402, 502) comprises terminating, by the first ECD, the base channel (e.g., 310, 418, 518) with the second ECD. In some examples, terminating, by the first ECD, the channel connection (e.g., 306) with the second ECD further comprises unpairing from the second ECD. In some examples, rendering the prompt (see e.g., 406, 516) at the first ECD, responsive to receiving the channel connection-initiation signal (e.g., 403, 503) comprises rendering audio using a speaker (e.g., 112) of the first ECD.

In at least one example of method 600 and/or method 700, rendering the prompt (see e.g., 406, 516) at the first ECD (e.g., 201, 301, 401, 501), responsive to receiving the channel connection-initiation signal (e.g., 403, 503) comprises actuating one or more LEDs (e.g., 130) of the first ECD.

In at least one example of method 600 and/or method 700, detecting, at the first ECD (e.g., 201, 301, 401, 501), the first user input corresponding to the prompt (see e.g., 406, 516) comprises detecting entry, through a user interface (e.g., 210) of the first ECD, of an alpha-numeric code (e.g., 212) displayed by a display (e.g., 118) of the second ECD (e.g., 202, 302, 402, 502).

In at least one example of this disclosure, method 600 and/or method 700 also include: determining, at the first ECD (e.g., 201, 301, 401, 501) that a quantity of current channel connections (e.g. 306) with one or more other ECDs is below a predetermined limit; and wherein receiving, at the first ECD, the channel connection-initiation signal (e.g., 403, 503) from the second ECD (e.g., 202, 302, 402, 502) is responsive to determining, at the first ECD that the quantity of current channel connections with one or more other ECDs is below the predetermined limit. In at least one example, the first ECD is limited to two channel connections.

In at least one example of this disclosure, method 600 and/or method 700 also include: capturing audio data using a microphone (e.g., 114) of the first ECD (e.g., 201, 301, 401, 501); transmitting, by the first ECD, one or more data packets (e.g., 308) to the second ECD (e.g., 202, 302, 402, 502) over one or more channels (e.g., 310) of the channel connection (e.g., 306), the one or more data packets corresponding to the audio data; determining that a length of time since a transmission of a most recently transmitted data packet exceeds a predetermined threshold; and terminating (e.g., 432, 532), by the first ECD, the channel connection with the second ECD, responsive to determining that the length of time since the transmission of the most recently transmitted data packet exceeds the predetermined threshold (e.g., four minutes).

Figure 8:
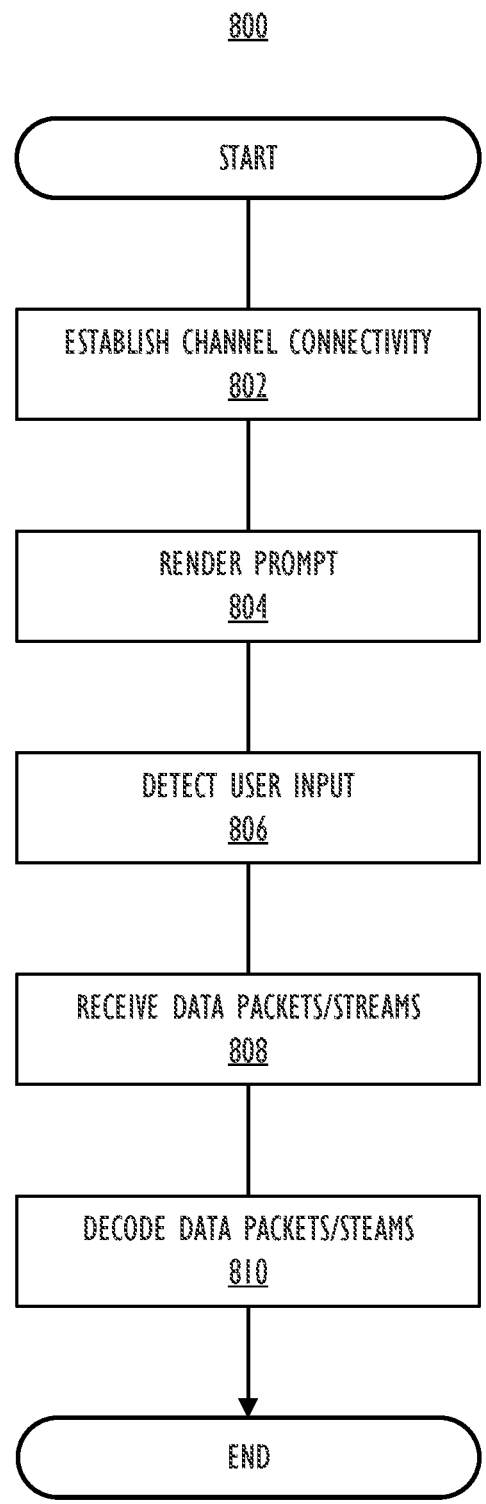
FIG. 8 illustrates still another method of managing channel connectivity of an electronic communications device, in accordance with an example of this disclosure.

FIG. 8 illustrates another method 800 of managing channel connectivity of an ECD 100, in accordance with an example of this disclosure. The first step 802 of method 800 includes establishing, by a first ECD (e.g., 201), a channel connection with a second ECD (e.g., 202) to which the first ECD is paired. Thereafter, the method 800 proceeds to step 804, in which, in response to (and contingent upon) establishing the channel connection, the first ECD (e.g., 201) renders a prompt (at the first ECD (e.g., 301)). The prompt (e.g., 410) which is rendered at the first ECD (e.g., 301) is intended to instigate the user of the second ECD (e.g., 302) to take some sort of action to indicate their desire to have the first ECD (e.g., 401) (e.g., a speakerphone) capture audio and/or video for the second ECD (e.g., 402) and/or their desire for the first ECD (e.g., 401) to receive and render audio and/or video from the second ECD (e.g., 502) (e.g., a mobile phone), such as when the owner of the second ECD (e.g., 502) wishes to use the microphone(s) and/or speaker(s) of the first ECD (e.g., 501) for a phone call of the second ECD (e.g., 202) (e.g., instead of the microphone(s) and/or speaker(s) of the second ECD (e.g., 302). Once the prompt has been rendered in step 804, the method 800 proceeds to step 806 in which the first ECD (e.g., 501) detects a user input corresponding to the prompt (entered at the first ECD (e.g., 201), such as by pressing one or more buttons of an interface (e.g., 210) of the ECD).

Thereafter, in step 808, the first ECD (e.g., 301) receives one or more data packets from the second ECD (e.g., 302) over one or more channels of the channel connection. In some examples of this disclosure, the first ECD (e.g., 401) will stop receiving (accepting) any further data packets from the second ECD (e.g., 402) if the user does not enter the user input corresponding to the prompt (e.g., 510) within a predetermined amount of time (e.g., ten seconds) in step 806. If, (and only if), the first ECD (e.g., 501) detected the user input corresponding to the prompt in step 806, will the method 800 proceed to step 810, in which the first ECD (e.g., 201) decodes one or more data packets from the second ECD (e.g., 502). In some examples of this disclosure, method 800 also includes rendering, using a speaker of the first ECD, first audio corresponding to the decoded one or more data packets, responsive to detecting, at the first ECD, the user input corresponding to the prompt.

In one or more examples of this disclosure, method 800 also includes: capturing second audio using a microphone (e.g., 114) of the first ECD and encoding—using an encoder (e.g., 134) of the first ECD— the second audio for transmission to the second ECD over the channel connection, responsive to detecting the user input corresponding to the prompt (e.g., 510).

In at least one example of this disclosure, method 800 also includes rendering, using a display of the first ECD, first video corresponding to the one or more data packets, responsive to detecting, at the first ECD, the user input corresponding to the prompt. In some examples, method 800 also includes capturing second video using a camera (e.g., 132) of the first ECD and encoding—using an encoder of the first ECD—the second video for transmission to the second ECD over the channel connection (e.g., 306), in response to—and as a consequence of—detecting the user input corresponding to the prompt.

Figure 9A:
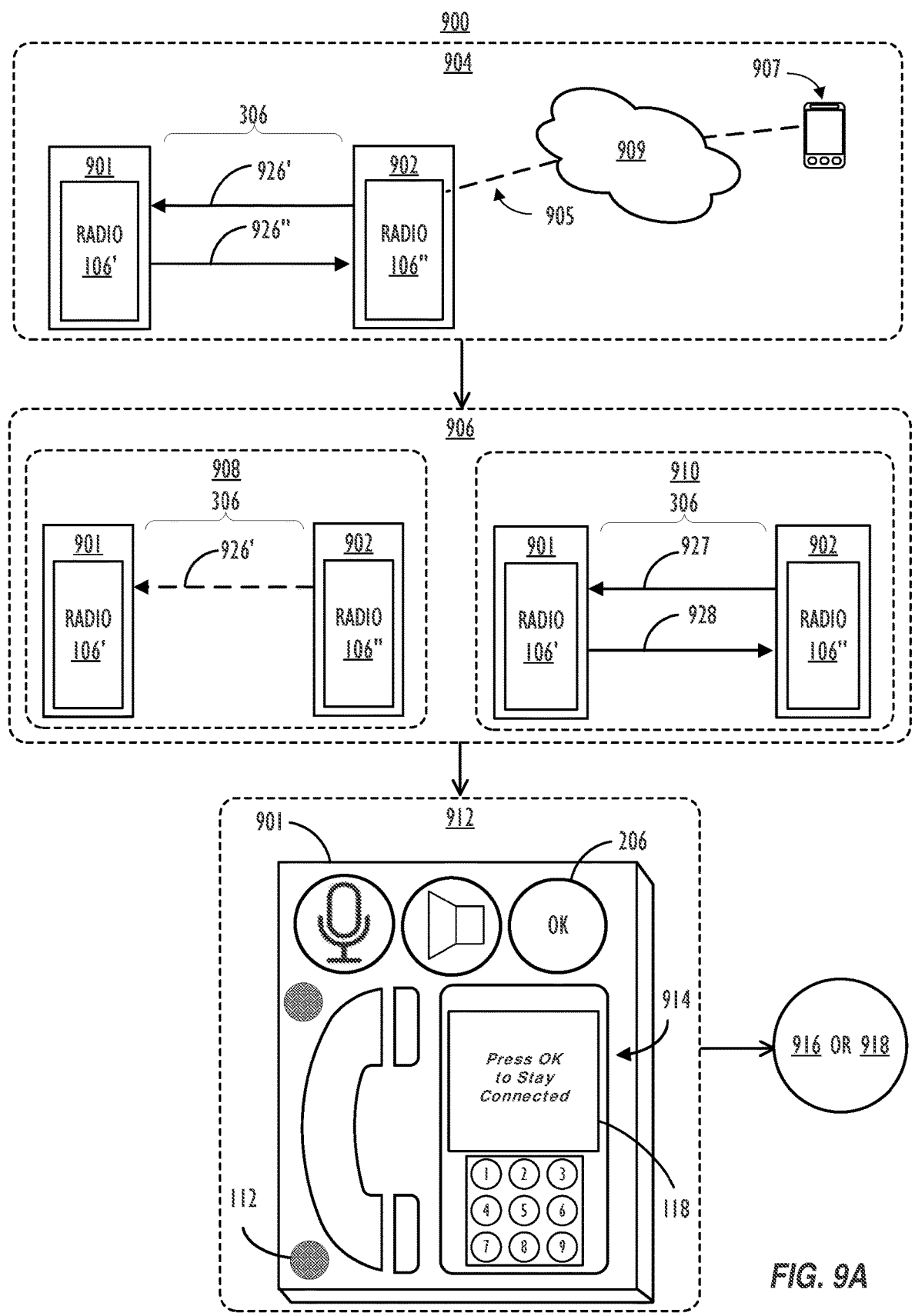
FIGS. 9A-9B illustrate another process of managing channel connectivity of an electronic communications device, in accordance with an example of this disclosure.
Figure 9B:
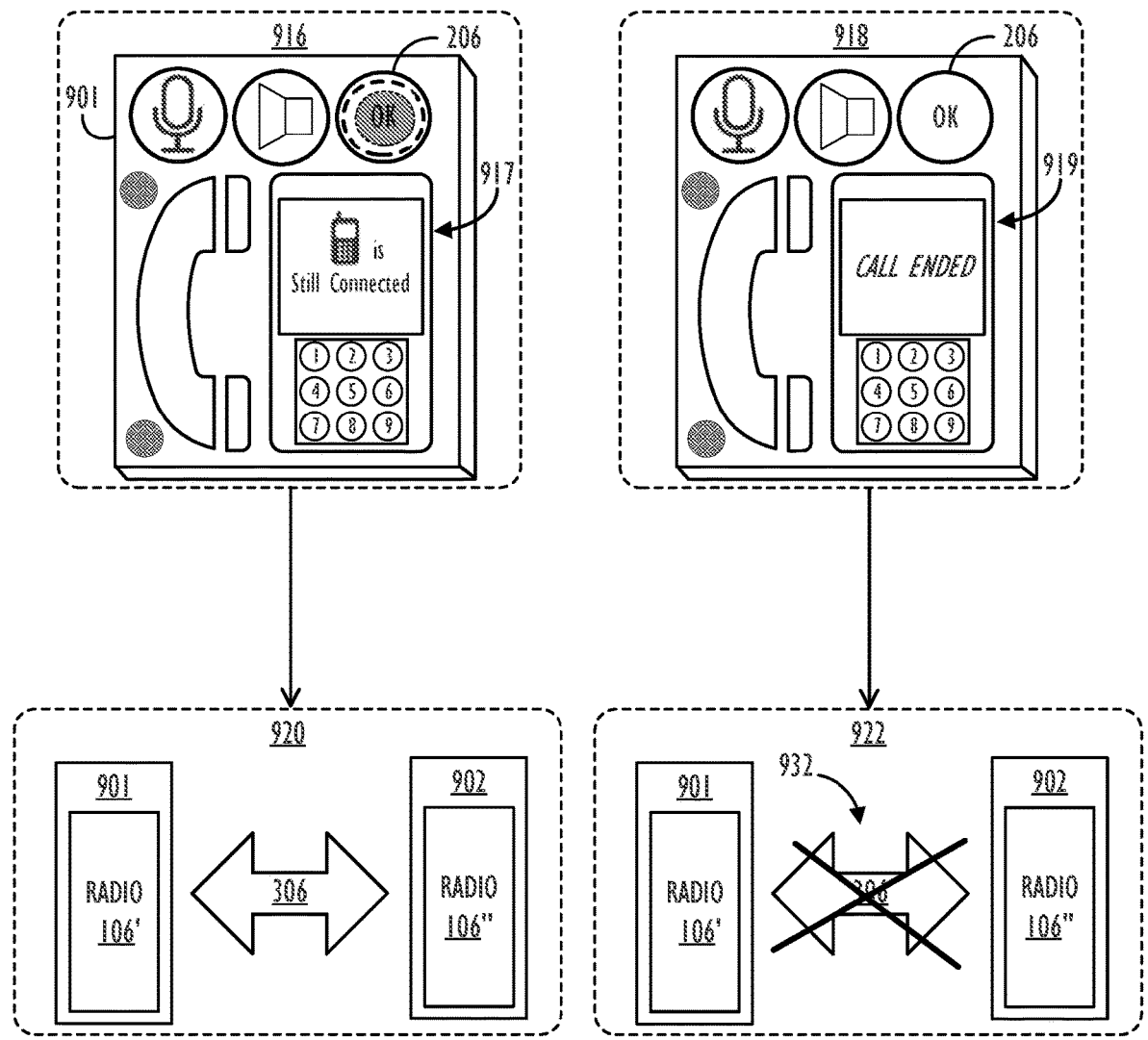

FIGS. 9A-9B illustrate a process 900 for reducing the likelihood that a person will (e.g., using their mobile phone) remain connected to a public communications device longer than person had intended. In step 904 a first ECD 901 (e.g., a speakerphone) and a second ECD 902 (e.g., a mobile phone) are sending data streams 926 to each other over a channel connection 306. It will be understood by those of skill that channel connection 306 cannot exist unless the first ECD 901 and the second ECD 902 had previously been paired (bonded) at some point. In process 900, the second ECD 902 is being used to conduct a telephone call 905. Audio for the phone call 905 is captured by the first ECD 901 and sent to the second ECD 902, which retransmits the audio (or other data) captured by the first ECD 901 to a remote endpoint 907 (e.g., another mobile phone), possibly through a network such as the cloud 909.

Later, at step 906, the first ECD 901 (using a processor 116) makes a determination that the second ECD's phone call has ended. Such a determination can occur as illustrated in sub-step 908, in which the first ECD 901 (using a processor 116 and a timer 128) determines that the time since the last data stream 926 was received by the first ECD 901 has exceeded a limit (e.g., 4-5 minutes) which is consistent with a user of the second ECD 902 having ended the call 905. Another way that the first ECD 901 can determine that the second ECD 902 has ended its call 905 is that the first ECD 901 receives a call termination signal 927 from the second ECD 901, as shown in sub-step 910. In some examples the first ECD 901 will send an acknowledgment signal 928 to the second ECD 902 to confirm that the call termination signal 927 was received. In response to determining that the call 905 has ended, in step 912, the first ECD 901 renders a prompt 914 for a user to enter some type of input at the first ECD 901. Such prompt 914 can come in the form of audio emitted from a speaker 112 or a flashing LED (130) etc. In FIG. 9A, the prompt 914 is a displayed message to press the OK button 206. Thereafter, as illustrated in FIG. 9B, the user can comply with the prompt as shown in step 916, in which the user presses the OK button 206. If the first ECD 901 detects that the OK button 206 was pressed (within a predetermined amount of time since the prompt 914 was rendered), the first ECD 901 will maintain the channel connection 306 with the second ECD 902, as illustrated in step 920. In some examples, the first ECD 901 will display an indication 917 that the channel connection 306 has been maintained. On the other hand, if, as depicted in step 918, the user does not respond timely and appropriately to the prompt (in this case, fails to press the OK button 206 soon enough), the first ECD 901 will end 932 its channel connection 306 with the second ECD 901, as shown in step 922. In some examples, the first ECD 901 will render an indication 919 that the channel connection 306 has been terminated 932.

Figure 10:
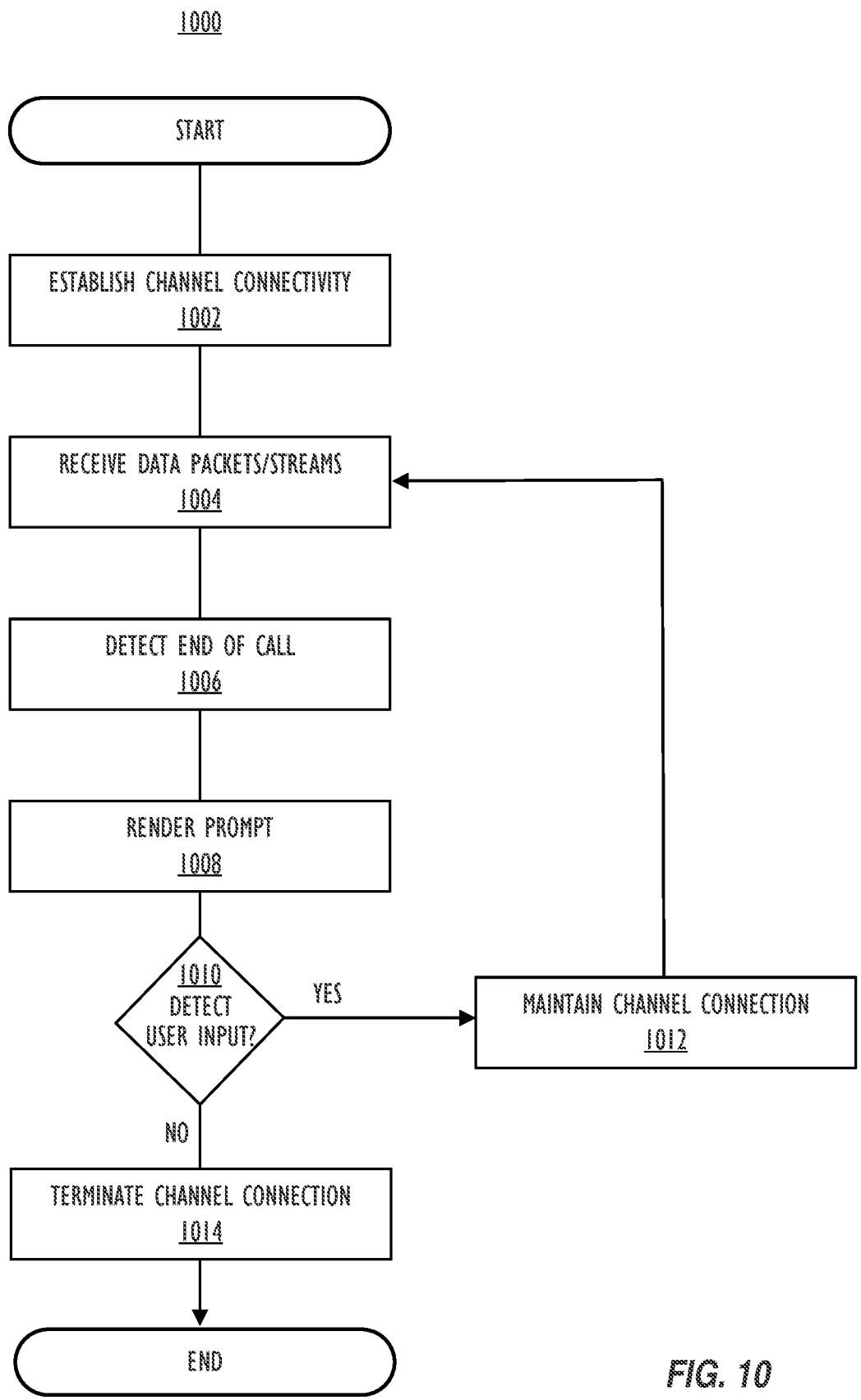
FIG. 10 illustrates another method of managing channel connectivity of an electronic communications device, in accordance with an example of this disclosure.

FIG. 10 illustrates a method 1000 of managing a channel connection of an ECD 100, in accordance with an example of this disclosure. The method 1000 begins at step 1002, in which a first ECD (e.g., 201) establishes a channel connection with a second ECD (e.g., 202) to which the first ECD was previously paired. Once there is a channel connection 306, the method 1000 proceeds to step 1004, in which the first ECD (e.g., 201) receives one or more data packets (e.g., 308) from the second ECD (e.g., 202) over one or more channels (e.g., 310) of the channel connection. In some examples of method 1000, the one or more data packets correspond to a telephonic call of the second ECD (e.g., 302). Later, in step 1006, the first ECD (e.g., 901) determines that the telephonic call (e.g., 905) of the second ECD (e.g., 902) has ended. The method 1000 then proceeds to step 1008, in which the first ECD (e.g., 901) renders a prompt (e.g., 914) responsive to determining that the telephonic call of the second ECD (e.g., 902) has ended. The user will respond to the prompt or the user will not respond to the prompt. If, at step 1010 the first ECD (e.g., 901) detects a user input corresponding to the prompt, the method 1000 will proceed to step 1012 in which the channel connection 306 is maintained and the first ECD (e.g., 901) and the second ECD (e.g., 302) can still communicate over the channel connection as in step 1004. On the other hand, if the first ECD (e.g., 501) determines at step 1010 that a responsive user input was not detected within a reasonable amount of time (e.g., 9.5 seconds), the method 1000 will proceed to step 1014 in which the first ECD (e.g., 501) terminates (e.g., 932) the channel connection 306. It will be understood that the first ECD and second ECD do not, in most instances, become unpaired just because they are not currently connected over a channel connection.

In at least one example of method 1000, determining (at step 1006) that the telephonic call (e.g., 905) of the second ECD (e.g., 902) has ended comprises determining that a length of time since a reception of a most recently received data packet from the second ECD (e.g., 902) exceeds a predetermined threshold (see sub-step 908 in FIG. 9A). In some examples, determining, at the first ECD (e.g., 901), that the telephonic call (e.g., 905) of the second ECD (e.g., 902) has ended (in step 1006) comprises receiving, at the ECD (e.g., 901), a call-termination signal (e.g., 927) from the second ECD (e.g., 902).

Examples of this disclosure also include:
1. A telecommunications device (e.g., 201, 301, 401, 501) comprising a processor (e.g., 116) coupled to a memory (e.g., 120) storing instructions (e.g., 122) executable by the processor (e.g., 116), wherein the instructions (e.g., 122) comprise instructions (e.g., 122) to: detect, at the telecommunications device, a channel connection-initiation signal (e.g., 403, 503) from a wireless communications device (e.g., 202, 302, 402, 502); render a prompt (see e.g., 406, 516) at the telecommunications device, responsive to detecting the channel connection-initiation signal; detect, at the telecommunications device, a first user input corresponding to the prompt; establish a base channel (e.g., 310, 418, 518) between the telecommunications device and the wireless communications device; and connect the telecommunications device to the wireless communications device over a channel connection (e.g., 306), responsive to establishing the base channel.
2. The telecommunications device of example 1, wherein the instructions (e.g., 122) further comprise instructions (e.g., 122) to: receive, at the telecommunications device, one or more data packets (e.g., 308) from the wireless communications device (e.g., 202, 302, 402, 502) over one or more channels (e.g., 310) of the channel connection (e.g., 306); determine that a length of time (e.g., two minutes) since a reception of a most recently received data packet exceeds a predetermined threshold; and end the channel connection (e.g., 306) between the telecommunications device and the wireless communications device, responsive to determining that the length of time since the reception of the most recently received data packet exceeds a predetermined threshold.
3. The telecommunications device of example 1, wherein the instructions (e.g., 122) further comprise instructions (e.g., 122) to: receive, at the telecommunications device, one or more data packets (e.g., 308) from the wireless communications device (e.g., 202, 302, 402, 502) over one or more channels (e.g., 310) of the channel connection (e.g., 306); determine that a length of time (e.g., three minutes) since a reception of a most recently received data packet exceeds a predetermined threshold; render a second prompt (see e.g., 406, 516) at the telecommunications device, responsive to determining that the length of time (e.g., three minutes) since the reception of the most recently received data packet exceeds a predetermined threshold; determine that a second user input corresponding to the second prompt has not been detected within a predetermined length of time since rendering the second prompt; end the channel connection (e.g., 306) between the telecommunications device and the wireless communications device, responsive to determining that the second user input corresponding to the second prompt has not been detected within the predetermined length of time since rendering the second prompt.
4. The telecommunications device of example 3, wherein the instructions (e.g., 122) to end the channel connection (e.g., 306) between the telecommunications device and the wireless communications device (e.g., 202, 302, 402, 502) comprise instructions (e.g., 122) to terminate the base channel (e.g., 310, 418, 518) between the telecommunications device and the wireless communications device.
5. The telecommunications device of example 4, wherein the instructions (e.g., 122) to end the channel connection (e.g., 306) between the telecommunications device and the wireless communications device (e.g., 202, 302, 402, 502) further comprise instructions (e.g., 122) to unpair the telecommunications device from the wireless communications device.
6. The telecommunications device of example 1, wherein the instructions (e.g., 122) to render the prompt (see e.g., 406, 516) at the telecommunications device, responsive to receiving the channel connection-initiation signal (e.g., 403, 503) further comprise instructions (e.g., 122) to render audio using a speaker of the telecommunications device.

7. The telecommunications device of example 1, wherein the instructions (e.g., 122) to render the prompt (see e.g., 406, 516) at the telecommunications device, responsive to receiving the channel connection-initiation signal (e.g., 403, 503) further comprise instructions (e.g., 122) to actuate one or more LEDs (e.g., 130) of the telecommunications device.

8. The telecommunications device of example 1, wherein the instructions (e.g., 122) to detect, at the telecommunications device, the first user input corresponding to the prompt (see e.g., 406, 516) comprise instructions (e.g., 122) to detect entry, through a user interface (e.g., 210) of the telecommunications device, of an alphanumeric code (e.g., 212) displayed by a display (e.g., 118) of the wireless communications device (e.g., 202, 302, 402, 502).

9. The telecommunications device of example 1, wherein the telecommunications device is configured to operate in conformance with one or more Bluetooth standards.

10. The telecommunications device of example 1, wherein the instructions (e.g., 122) further comprise instructions (e.g., 122) to: capture audio data using a microphone (e.g., 114) of the telecommunications device; transmit, by the telecommunications device, one or more data packets (e.g., 308) to the wireless communications device (e.g., 202, 302, 402, 502) over one or more channels (e.g., 310) of the channel connection (e.g., 306), the one or more data packets (e.g., 308) corresponding to the audio data; determine that a length of time (e.g., 3.5 minutes) since a transmission of a most recently transmitted data packet exceeds a predetermined threshold; and end the channel connection (e.g., 306) between the telecommunications device and the wireless communications device (e.g., 202, 302, 402, 502), responsive to determining that the length of time since the transmission of the most recently transmitted data packet exceeds the predetermined threshold.

11. An ECD (e.g., 100) comprising a processor (e.g., 116) and a memory (e.g., 120), the memory storing instructions (e.g., 122) executable by the processor, wherein the instructions comprise instructions to: establish, using radio (e.g., 106) of a first ECD (e.g., 201), a channel connection (e.g., 306) with a second ECD (e.g., 202) which is paired/bonded to the first ECD; render, responsive to establishing the channel connection with the second ECD (e.g., 202), a prompt (e.g., 408) at the first ECD (e.g., 201); detect, at the first ECD (e.g., 301), a user input corresponding to the prompt (e.g., 408); receive, at the first ECD (e.g., 301), one or more data packets (e.g., 308) from the second ECD (e.g., 302) over one or more channels (e.g., 310) of the channel connection; and decode, using a decoder of the first ECD (e.g., 401), the one or more data packets from the second ECD (e.g., 302), responsive to detecting, at the first ECD (e.g., 401), the user input corresponding to the prompt (e.g., 408).

12. The ECD (e.g., 201) of example 11, wherein the instructions further comprise instructions to: render, using a speaker (e.g., 112) of the first ECD (e.g., 501), first audio corresponding to the one or more data packets (e.g., 308), responsive to detecting, at the first ECD (e.g., 501), the user input corresponding to the prompt (e.g., 410).

13. The ECD (e.g., 201) of example 12, wherein the instructions further comprise instructions to: capture, using a microphone (e.g., 114) of the first ECD (e.g., 901), second audio; and encode, using an encoder of the first ECD (e.g., 901), the second audio for transmission to the second ECD (e.g., 402) over the channel connection, responsive to detecting the user input corresponding to the prompt (e.g., 410).

14. The ECD (e.g., 301) of example 11, wherein the instructions (e.g., 122) further comprise instructions to: render, using a display (e.g., 118) of the first ECD (e.g., 201), first video corresponding to the one or more data packets (e.g., 308), responsive to detecting, at the first ECD (e.g., 201), the user input corresponding to the prompt (e.g., 510).

15. The ECD (e.g., 301) of example 14, wherein the instructions further comprise instructions to: capture, using a camera of the first ECD (e.g., 301), second video; and encode, using an encoder (e.g., 134) of the first ECD (e.g., 301), the second video for transmission to the second ECD (e.g., 402) over the channel connection, responsive to detecting the user input corresponding to the prompt (e.g., 510).

16. An ECD (e.g., 401) comprising a processor (e.g., 116) and a memory (e.g., 120) storing instructions (e.g., 122) executable by the processor, wherein the instructions comprise instructions to: establish, using a radio (e.g., 106) of the ECD, a channel connection (e.g., 306) with a second ECD (e.g., 502); receive, at the ECD, one or more data packets (e.g., 308) from the second ECD (e.g., 502) over one or more channels (e.g., 310) of the channel connection, the one or more data packets corresponding to a telephonic call of the second ECD (e.g., 502); determine that the telephonic call of the second ECD (e.g., 502) has ended; render, responsive to determining that the telephonic call of the second ECD (e.g., 502) has ended, a prompt (e.g., 914) at the ECD; detect, at the ECD, a user input corresponding to the prompt (e.g., 914); and maintain, using the radio of the ECD, the channel connection with the second ECD (e.g., 502), responsive to detecting the user input corresponding to the prompt (e.g., 914).

17. The ECD (e.g., 901) of example 16, wherein the instructions (e.g., 122) to determine that the telephonic call (e.g., 905) of the second ECD (e.g., 902) has ended comprise instructions to determine that a length of time (e.g., one minute) since a reception of a most recently received data packet from the second ECD (e.g., 902) exceeds a predetermined threshold (e.g., 59 seconds).

18. The ECD (e.g., 901) of example 16, wherein the instructions (e.g., 122) to determine that the telephonic call of the second ECD (e.g., 202) has ended comprise instructions to detect, at the ECD, a call-termination signal (e.g., 927) sent by the second ECD (e.g., 202) over the channel connection.

19. An ECD (e.g., 100) comprising a processor (e.g., 116) and a memory (e.g., 120) storing instructions (e.g., 122) executable by the processor, wherein the instructions comprise instructions to: establish, using a radio (e.g., 106) of the ECD, a channel connection (e.g., 306) with a second ECD (e.g., 302); receive, at the ECD, one or more data packets (e.g., 308) from the second ECD (e.g., 302) over one or more channels (e.g., 310) of the channel connection, the one or more data packets corresponding to a telephonic call of the second ECD (e.g., 302); determine that the telephonic call of the second ECD (e.g., 302) has ended; render, responsive to determining that the telephonic call of the second ECD (e.g., 302) has ended, a prompt (e.g., 914) at the ECD; determine that a user input corresponding to the prompt (e.g., 914) has not been detected at the ECD within a predetermined length of time (e.g., ten seconds) since rendering the prompt (e.g., 914); and terminate the channel connection with the second ECD (e.g., 302), responsive to determining that the user input corresponding to the prompt (e.g., 914) has not been detected within the predetermined length of time since rendering the prompt (e.g., 914).

20. The ECD (e.g., 100) of example 19, wherein the instructions (e.g., 122) to determine that the telephonic call of the second ECD (e.g., 302) has ended comprise instructions to determine that a length of time since a reception of a most recently received data packet from the second ECD (e.g., 302) exceeds a predetermined threshold.

21. The ECD (e.g., 301) of example 19, wherein the instructions (e.g., 122) to determine that the telephonic call (e.g., 905) of the second ECD (e.g., 902) has ended, comprise instructions to acknowledge (see e.g., 928), using the radio (e.g., 106) of the ECD, a call-termination signal (e.g., 927) sent by the second ECD (e.g., 902) over the channel connection.

The various examples within this disclosure are provided by way of illustration and should not be construed to limit the scope of the disclosure. Various modifications and changes can be made in light of the principles and examples described herein without departing from the scope of the disclosure and without departing from the claims which follow.

It is claimed:

1. A method of managing channel connectivity of an electronic communications device, comprising:
    receiving, at a first electronic communications device, a channel connection-initiation signal from a second electronic communications device, to which the first electronic communications device is paired;
    rendering a prompt at the first electronic communications device, responsive to receiving the channel connection-initiation signal;
    detecting, at the first electronic communications device, a first user input corresponding to the prompt;
    establishing, at the first electronic communications device, a base channel with the second electronic communications device, responsive to detecting the first user input corresponding to the prompt;
    connecting, by the first electronic communications device, with the second electronic communications device over a channel connection, responsive to establishing the base channel;
    receiving, at the first electronic communications device, one or more data packets from the second electronic communications device over one or more channels of the channel connection;
    determining that a length of time since a reception of a most recently received data packet from the second electronic communications device exceeds a predetermined threshold;
    rendering a second prompt at the first electronic communications device, responsive to determining that the length of time since the reception of the most recently received data packet from the second electronic communications device exceeds a predetermined threshold;
    determining, at the first electronic communications device, that a second user input corresponding to the second prompt has not been detected within a predetermined length of time since rendering the second prompt; and
    terminating, by the first electronic communications device, the channel connection with the second electronic communications device, responsive to determining that the second user input corresponding to the second prompt has not been detected within the predetermined length of time since rendering the second prompt.

2. The method of claim 1, wherein terminating, by the first electronic communications device, the channel connection with the second electronic communications device comprises terminating, by the first electronic communications device, the base channel with the second electronic communications device.

3. The method of claim 2, wherein terminating, by the first electronic communications device, the channel connection with the second electronic communications device further comprises unpairing from the second electronic communications device.

4. The method of claim 1, wherein rendering the prompt at the first electronic communications device, responsive to receiving the channel connection-initiation signal comprises rendering audio using a speaker of the first electronic communications device.

5. The method of claim 1, wherein rendering the prompt at the first electronic communications device, responsive to receiving the channel connection-initiation signal comprises actuating one or more light emitting diodes of the first electronic communications device.

6. The method of claim 1, wherein detecting, at the first electronic communications device, the first user input corresponding to the prompt comprises detecting entry, through a user interface of the first electronic communications device, of an alpha-numeric code displayed by a display of the second electronic communications device.

7. The method of claim 1, further comprising:
    determining, at the first electronic communications device that a quantity of current channel connections with one or more other electronic communications devices is below a predetermined limit; and
    wherein receiving, at the first electronic communications device, the channel connection-initiation signal from the second electronic communications device is responsive to determining, at the first electronic communications device that the quantity of current channel connections with the one or more other electronic communications devices is below the predetermined limit.

8. The method of claim 1, further comprising:
    capturing audio data using a microphone of the first electronic communications device;
    transmitting, by the first electronic communications device, one or more outgoing data packets to the second electronic communications device over the one or more channels of the channel connection, the one or more outgoing data packets corresponding to the audio data;
    determining that a second length of time since a transmission of a most recently transmitted outgoing data packet exceeds a second predetermined threshold; and
    terminating, by the first electronic communications device, the channel connection with the second electronic communications device, responsive to determining that the second length of time since the transmission of the most recently transmitted outgoing data packet exceeds the second predetermined threshold.

9. A telecommunications device comprising a processor coupled to a memory storing instructions executable by the processor, wherein the instructions comprise instructions to:
- detect, at the telecommunications device, a channel connection-initiation signal from a wireless communications device paired to the telecommunications device;
- render a prompt at the telecommunications device, responsive to detecting the channel connection-initiation signal;
- detect, at the telecommunications device, a first user input corresponding to the prompt;
- establish a base channel between the telecommunications device and the wireless communications device, responsive to detecting the first user input corresponding to the prompt;
- connect the telecommunications device to the wireless communications device over a channel connection, responsive to establishing the base channel;
- receive, at the telecommunications device, one or more data packets from the wireless communications device over one or more channels of the channel connection;
- determine that a length of time since a reception of a most recently received data packet from the wireless communications device exceeds a predetermined threshold;
- render a second prompt at the telecommunications device, responsive to determining that the length of time since the reception of the most recently received data packet from the wireless communications device exceeds a predetermined threshold;
- determine that a second user input corresponding to the second prompt has not been detected within a predetermined length of time since rendering the second prompt; and
- end the channel connection between the telecommunications device and the wireless communications device, responsive to determining that the second user input corresponding to the second prompt has not been detected within the predetermined length of time since rendering the second prompt.

10. The telecommunications device of claim 9, wherein the instructions to end the channel connection between the telecommunications device and the wireless communications device comprise instructions to terminate the base channel between the telecommunications device and the wireless communications device.

11. The telecommunications device of claim 10, wherein the instructions to end the channel connection between the telecommunications device and the wireless communications device further comprise instructions to unpair the telecommunications device from the wireless communications device.

12. The telecommunications device of claim 9, wherein the instructions to render the prompt at the telecommunications device, responsive to receiving the channel connection-initiation signal further comprise instructions to render audio using a speaker of the telecommunications device.

13. The telecommunications device of claim 9, wherein the instructions to render the prompt at the telecommunications device, responsive to receiving the channel connection-initiation signal further comprise instructions to actuate one or more light emitting diodes of the telecommunications device.

14. The telecommunications device of claim 9, wherein the instructions to detect, at the telecommunications device, the first user input corresponding to the prompt comprise instructions to detect entry, through a user interface of the telecommunications device, of an alpha-numeric code displayed by a display of the wireless communications device.

15. The telecommunications device of claim 9, wherein the telecommunications device is configured to operate in conformance with one or more Bluetooth standards.

16. The telecommunications device of claim 9, wherein the instructions further comprise instructions to:
- capture audio data using a microphone of the telecommunications device;
- transmit, by the telecommunications device, one or more outgoing data packets to the wireless communications device over the one or more channels of the channel connection, the one or more outgoing data packets corresponding to the audio data;
- determine that a second length of time since a transmission of a most recently transmitted outgoing data packet exceeds a second predetermined threshold; and
- end the channel connection between the telecommunications device and the wireless communications device, responsive to determining that the second length of time since the transmission of the most recently transmitted outgoing data packet exceeds the second predetermined threshold.

* * * * *